Feb. 18, 1969    R. G. HANNEMAN ET AL    3,427,978
ELECTRO-HYDRAULIC TRANSDUCER
Filed Jan. 24, 1968    Sheet 1 of 5

INVENTORS.
ROBERT GORDEN HANNEMAN
MACK GORDON
HARRY GREGOR
BY
Meyer, Baldwin, Doran & Egan
ATTORNEYS INVENTORS.
ROBERT GORDEN HANNEMAN
MACK GORDON
HARRY GREGOR
BY Meyers Baldwin, Doran & Egan
ATTORNEYS INVENTORS
ROBERT GORDEN HANNEMAN
MACK GORDON
HARRY GREGOR
BY Meyer, Baldwin, Doran & Egan
ATTORNEYS United States Patent Office 3,427,978
Patented Feb. 18, 1969

3,427,978
ELECTRO-HYDRAULIC TRANSDUCER
Robert Gorden Hanneman, Newbury, and Mack Gordon, Cleveland, Ohio, and Harry Gregor, New York, N.Y., assignors to Electro-Dynamics, Inc., Cleveland, Ohio, a corporation of Ohio
Continuation-in-part of application Ser. No. 393,834, Sept. 2, 1964. This application Jan. 24, 1968, Ser. No. 700,149
U.S. Cl. 103—1           9 Claims
Int. Cl. F04f $17/00$; B01k $3/10$; H01g $9/02$

ABSTRACT OF THE DISCLOSURE

An electro-osmotic closed system is provided comprising a container having two chambers completely separated by a porous diaphragm having pores permitting flow between the chambers with pore openings not larger than .10 to 10.0 microns. The system is completely filled with a purified, non-aqueous liquid having a hydrocarbon portion and a polar group and having a dielectric constant between 5 and 100. Electrodes are provided in said liquid on opposite sides of the diaphragm and these are chemically inert to the liquid when subjected to an electrical potential. An electrical conductor leads from each electrode to a point outside of the container. A small amount of a redox material is added to the nonaqueous liquid so that when an electrical potential of opposite polarity is applied to the two electrodes, the oxidation occurring at the anode substantially exacting balances the reduction occurring at the cathode so that the composition of the ionizing liquid remains in operational stable condition over a period of a number of hours during the continuous application of an electrical potential of 200 volts and higher to the electrodes. In one application of the invention, an electrical potential between 200 and 1500 volts is applied to the electrodes causing an electro-kinetic effect which tends to cause movement of the ionizing liquid through the pores of the diaphragm. In another application of the invention, means is provided for applying a pressure between the two liquid filled chambers whereby to produce an electrical potential between the two electrodes.

---

This application is a continuation-in-part of our copending application Ser. No. 393,834, filed Sept. 2, 1964, now abandoned.

This invention relates to improvements in electro-hydraulic transducers for the transduction of power between an electrical system and a liquid pressure system. Actuating the electrical system provides electro-osmotic pumps and electro-osmotic producers and, more particularly, improvements whereby practical, usable stable pressure and flows may be produced in an ionizing liquid wherein the apparatus is maintained in required stable conditions for commercially acceptable periods of time. Such a period should be at least two hours, the devices of this invention having been operated under stable conditions for periods from ten to twenty hours and longer.

One of the objects of the present invention is to provide an electro-osmotic pump comprising a container with two or more chambers with a liquid in a system including this container, together with a porous diaphragm submerged in the liquid and sealed in the container so as to form a partition between the chambers of the container, and with electrodes on opposite sides of the diaphragm substantially chemically inert to the liquid and to the electrical potential so that when a difference of electrical potential is applied to the electrodes on opposite sides of the diaphragm, the liquid flows or tends to flow through the pores of the diaphragm so as to build up a practical usable flow and/or pressure; or when the liquid is forcefully moved through the pores of the diaphragm, a potential is produced between the opposed electrodes.

Some of the more detailed objectives of the present invention include the provision of a stable ionizing liquid in an electro-hydraulic transducer which preferably includes the addition of redox systems to the liquid helping to provide reversible reactions at the electrodes so that the chemical composition of the electrolyte remains constant for practical purposes.

Another object is the provision of suitable porous diaphragms or membranes of high surface charge for use in such systems and in some cases, in addition, the treatment of such diaphragms chemically so as to produce large counter ions in the liquid in the pores, thus enhancing the zeta potential which increases the electro-osmotic action.

Other objects and advantages of the present invention will be apparent from the accompanying description and drawings and the essential features thereof will be set forth in the appended claims.

Figure 1:
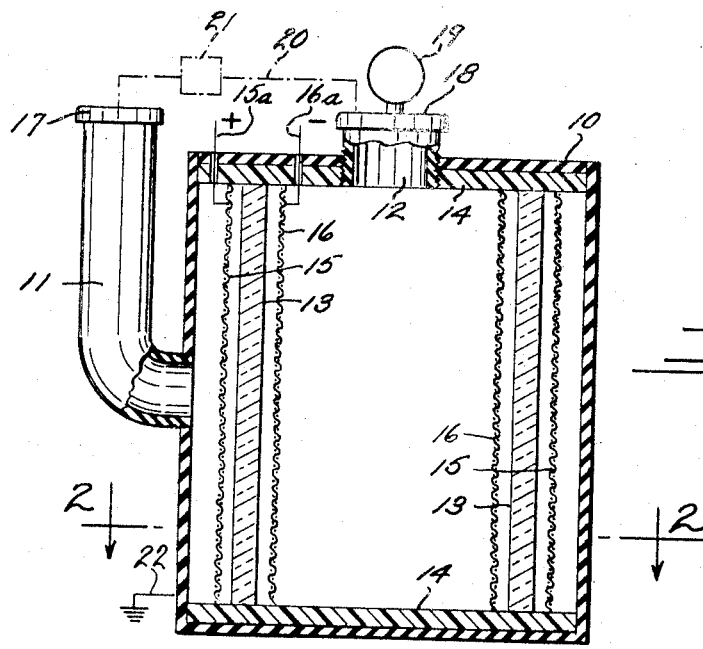
Figure 2:
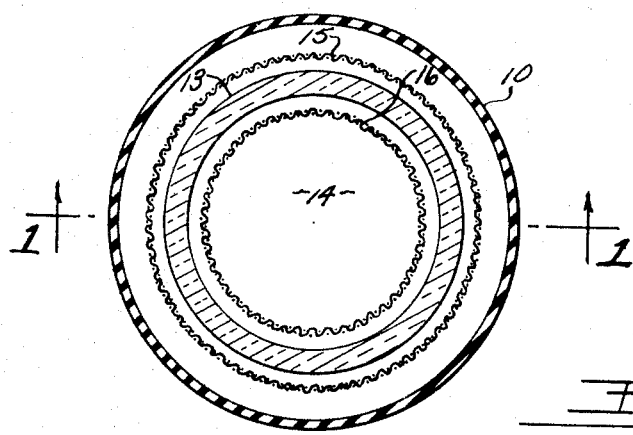
Figure 3:
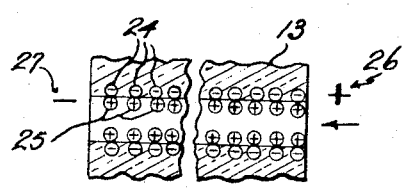
Figure 4:
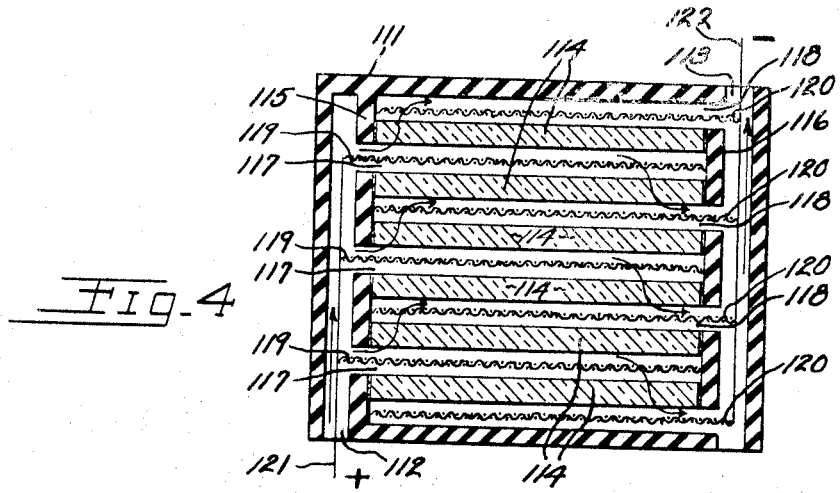
Figure 5:
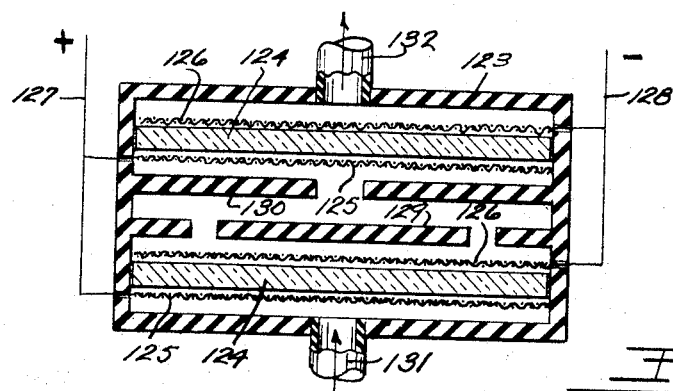

In the drawings:
FIG. 1 is a central sectional view through one embodiment of this invention taken along the line 1—1 of FIG. 2;
FIG. 2 is a transverse sectional view of the same taken along the line 2—2 of FIG. 1;
FIG. 3 is a diagrammatic sectional view greatly enlarged through a single pore of the membrane or diaphragm of FIGS. 1 and 2;
FIGS. 4 and 5 show electro-osmotic pumps of this invention connected up in parallel and in series, respectively;
FIGS. 6 through 13 show diagrammatically some suggested uses of this invention; while
FIG. 14 is a central sectional view through another embodiment of this invention wherein liquid may be forcefully moved through the pores of a porous diaphragm to cause the appearance of an electrical potential between electrodes on opposite sides of the diaphragm.

While the electro-osmotic action herein discussed has been known since the time of Reuss and Helmholtz, to the best of our knowledge and belief it has been only an interesting laboratory phenomenon, not useful for practical purposes in terms of providing a useful force or useful work.

For the purpose of describing this invention, we have shown somewhat schematically, in FIGS. 1 and 2, the form of apparatus illustrating this invention. A closed container 10 is provided with ports 11 and 12. Inside the container and between the ports is a cylindrical porous diaphragm 13. Wherever in the specification and claims hereof reference is made to a "porous" diaphragm, it is intended to define a diaphragm having through pores permitting flow completely through the diaphragm from one face to the other. This is sealed to the container in such a manner that any liquid moving between the ports 11 and 12 must pass through the pores of the diaphragm 13. In the drawings, the seal is in the form of material nonreactive to the electrolytic liquid utilized in this invention as shown at 14 sealing the ends of the diaphragm 13 against the walls of the container. In one form of our invention, this seal is made of "Teflon" (polytetrafluoroethylene resin) although other materials might be used as those skilled in this art will understand.

For applying a difference in electrical potential at the opposite faces of the diaphragm 13, suitable electrodes 15 and 16 are supplied. These electrodes are chemically insert to the ionizing liquid filling the container 10 when an electrical current is present. Those shown here, as by way of example, are intended to represent platinum screens of preferably fine mesh, 200 mesh screen having been used in one embodiment of this invention. Suitable leads 15a and 16a respectively are provided passing in a sealed and electrically insulated character through the "Teflon" seal 14 and the container 10 so that a difference in electrical potential may be supplied to the electrodes 15 and 16. It should be understood that these electrodes might also be of gold or other suitable materials. It should also be understood that these electrodes could be painted on the surface of the diaphragm 13 or deposited in thin films by suitable techniques such as plating, vapor diffusion, etc.

In FIG. 1 the port 11 is closed by a cap 17 and the port 12 is closed by a cap 18. For illustrative purposes, the cap 18 is provided with a device 19 intended to represent a gauge, a switch, a pressure diaphragm, servo motor or other device which might be operated either by the pressure or flow induced by the use of this novel electro-osmotic pump. If flow is to be produced, then the ports 11 and 12 will be connected by a conducting pipe line or conduit 20 so as to provide a closed liquid system including the container 10 as a component in the closed system. If necessary or desirable, a device could be inserted in the line 20 as indicated at 21 to make some useful application of the flow induced in the line 20 by the electro-osmotic pump such as to indicate the flow or to make a practical use of the flow.

The container is shown electrically grounded at 22 as a safety measure and is not required to operate the pump. Preferably the container is of electrically non-conductive material.

As mentioned above, the container 10 and connected parts of the liquid system such as 11, 12 or 20, are filled with a suitable liquid which we have herein designated "ionizing liquid" for simplicity of expression. It is intended that this term have a limited interpretation as hereinafter set forth. Not all organic liquids are equally usable in devices of this invention for the magnitude of the effect produced generally increases with the dielectric constant of the liquid, and liquids which have a very low dielectric constant show relatively low electro-osmotic effects. With this invention, we prefer to use liquids having dielectric constants between approximately 5 and 100, although liquids of higher and lower dielectric constant may be used. Apparently the force causing flow is dependent on the dielectric constant and the higher the constant the higher the flow. With liquids of the same viscosity flow is therefore greater than with those of higher dielectric constant. Also, there are many practical considerations in the choice of an electrolytic liquid, namely, its volatility, viscosity, its freezing point, its resistivity, and its chemical stability, its flash point and the like.

Several liquids suitable for use in the improved electro-osmotic pump will be described not in the sense of limitation but to illustrate the principle needed to apply this invention successfully. The preferred liquids have in addition to a high dielectric constant (which connotes polarity) a hydrocarbon portion and a polar group such as nitrile (—CN) as in butylnitrile, carbonyl (—C=O) as in ketones such as cyclohexanone, and aldehydes (R—CHO) such as in benzaldehyde, —OH as in alcohols such as methanol, isopropanol, etc., or other polar groups giving the same effect.

Polar organic compounds which have a group such as a ketone or aldehyde group which are reducible to alcohol and then oxidizable back to a ketone or aldehyde (or conversely which have a readily oxidizable group such as hydroxyl that forms an aldehyde or ketone) automatically have built-in redox action which provides stability of the liquid providing the voltage applied between two successive electrodes is not so great as to cause formation of other compounds. It has appeared that there is a maximum potential gradient that may be applied to each liquid if it is to remain stable except for the above self-generating redox action. Above this potential new compounds will tend to be formed and the device will be rendered less useful if not destroyed. We have found that the maximum voltage gradient where the liquid is stable may be greatly raised by incorporating therein the organic or inorganic redox material such as the quinone-hydroquinone, or ferriferrocyanide-ferroferrocyanide mentioned herein or equivalent material which undergoes preferential oxidation and reduction and thus protects the carrier liquid from decomposition and the formation of new compounnds. The ionizing liquid with a small amount of redox material added is preferred.

Certain organic liquids such as cyclohexanone and/or 2-nitropropane have proved to be highly suitable for this invention. The organic liquid used should be purified by careful standard procedures which may include distillation, adsorption and the like One such liquid is double distilled cyclohexanone. This cyclohexanone, $C_6H_{10}O$, is an oxidation product of cyclohexanol, $C_6H_{11}OH$. It is believed that the oxidation occuring at the anode and the reduction occurring at the cathode as between electrodes 15 and 16, in either direction, may aid the redox action necessary for this invention. The above liquid is one of many which provides a reasonably stable system for this invention, one capable of delivering practical pressures for long periods of time at practical rates of flow. Methyl alcohol is also a suitable liquid for use in this invention either because to some extent it creates its own redox, as suggested above, or because it does not become poisoned fast.

The term "redox" as used herein means a liquid used in an electro-osmotic device which, when subjected to an electric current between positive and negative electrodes, will produce an oxidized form of said liquid at one electrode and a reduced form of said liquid at the other electrode. Also these oxidized and reduced forms will respectively be converted to the reduced and oxidized forms when they travel to the opposite electrode, the rate of ionic transfer at the two electrodes being equal, thus providing a continuously reversible and stable chemical reaction. The redox action takes the place of electrical decomposition so that the redox satisfies the energy balance requirements leaving the system stable.

An improved pump according to this invention may be made employing systems as described above but adding certain of these reversible oxidation-reduction systems. Such a redox system may include, for instance, quinone-hydroquinone dissolved in a suitable solvent such as cyclohexanone or 2-nitropropane. With the use of this redox couple in this invention, the hydroquinone is oxidized to quinone at the anode, and the quinone is reduced to hydroquinone at the cathode. The combination of transport or diffusive processes carries the reduced and oxidized form of the system to the opposite electrode where a completely reversible reaction can take place. In principle, this will allow one to pass a direct or half-cycle direct current or rectified alternating current through the electrolyte of this invention for an indefinite period of time without deterioration of the electrolytic liquid. It is known that concentration polarization does occur, but with a suitable system the rate of the diffusive process may be equal to the reaction at the electrode. There are many obvious advantages to the use of this redox system because its presence helps preclude the oxidation and reduction of the solvent itself, which with some liquids is undesirable as it may lead to irreversible effects in the liquid. Also, it allows the current to be reversed as between the electrodes 15 and 16 so as to reverse the movement or tendency of movement through the diaphragm 13, and it allows the use of a single kind of electrode for both the anode and cathode.

Another redox system useful in this invention is a complex ion system including salts of ferric-ferrous ions, and the like. For instance, we may use ferro-ferricyanide dissolved in a suitable solvent such as cyclohexanone or 2-nitropropane. This system when used in this invention will have the ferrocyanide oxidized to ferricyanide at the anode and the ferricyanide reduced to ferrocyanide at the cathode. This, as in the case of the previously described ionizing liquids, will give a stable liquid over commercially accepted periods of time.

We have found that the ions or charges on the surface of the pores of the diaphragm are of great importance and that by suitable treatment of the walls of these pores we can readily change the rate and (in some cases) even direction of flow through the diaphragm. The treatment of the pores is to produce large ionizing or ion exchange groups on the pore surfaces. Through experimentation we have found that the amount of liquid pumped through the diaphragm 13 increases with the size of the counter-ion, either by virtue of the counter-ions being large per se, or because they are in higher concentration. Accordingly, this invention teaches the advantage of treating the diaphragm to obtain a higher intensity in the counter-ion layer in the liquid in the pores. For example, using a porous fritted glass for the diaphragm 13, this glass may be preliminarily treated with an alkaline solution having a large quaternary ammonium ion present, such, for example, as tetrapropylammonium hydroxide or other alkyl or aryl ammonium hydroxide. The tetrapropylammonium ion remains in the frit to produce the desired larger counter-ion intensity in the ionizing liquid in its pores. This imparts a higher zeta potential between the diaphragm and the liquid and promotes greater electro-osmotic effect in the system. Referring to FIG. 3, there is shown a greatly enlarged pore at 23 extending through the diaphragm 13. It should be understood that these pores are in a range from about 0.1 micron to 10.0 microns opening with a preferred value of 0.1 micron opening. There is indicated at 24 the negative ions in the glass frit which form a layer and which presumably could be the silicate anions or the tetrapropylammonium ions as mentioned above. A layer of counter-ions 25, which preferably are the large ions, are formed in the ionizing liquid filling the pore 23. With this condition, if a positive electrical potential is provided on an electrode in the position indicated at 26, and a negative potential on the electrode indicated at 27, then the counter-ions 25 will be repelled by the electrode 26 and attracted by the electrode 27 so as to move, or tend to move to the left with the liquid through the pore 23. This illustrates the principle that the larger the counter-ions, the more efficiently the liquid will be moved through the pore. Also the smaller the pore the greater the efficiency in relation to the counter-ions size.

While this invention may be utilized with some non-uniform pores in the diaphragm 13, it is important, for a given application, that the pore sizes be as uniform as possible to achieve the maximum possible efficiency.

This invention may also utilize improved diaphragms such as glass frits which have been treated to increase their surface charges and the zeta potential, ceramic frits of high surface charge which include those constructed of aluminum oxide, plastics such as polystyrene, sulfonated polystyrene, A.B.S. (acrylonitrile-butadiene-styrene copolymers), styrene-acrylonitrile copolymers, phenol formaldehyde resins, epoxy resins and polyester resins, rubber (including neoprene and sulfur vulcanizable synthetic and natural rubbers), paper and cellulose, all of high surface charge, synthetic resin membranes which have been treated to embody fixed organic ion grounds, organic membranes containing high concentrations of fixed ion groups (ion-exchange membranes including both the anion and cation exchange syrenes), and suitable modifications and combinations thereof. Nonion exchange synthetic resins may also be used for diaphragm material as they may be easily treated in situ to produce desirable counter-ions or polar groups such as sulfonic acid or quaternary ammonium groups on the surface of the pores which may be formed by means well known in the art. Synthetic resins are especially desirable because they may be of a standard chemical composition, and uniform. The resins or plastics may be reinforced with suitable fibers such as fiber glass if desired.

An electro-osmotic pump constructed according to this invention which is capable of delivering a low volume of liquid at a high pressure (and at a reasonably low voltage) will, in general, contain a finer pore structure than one constructed to deliver a high volume at a relatively low pressure with a given liquid.

One of the features of this invention is that reversing the current on the electrodes 15 and 16, reverses the direction of action of the pump. Therefore, the electrodes 15 and 16 instead of being positive and negative respectively, as shown in FIG. 1, could have the charges reversed. It is important for some applications that this reversing action of the pump occur in a reasonably short time interval, and that the reverse action be equal and opposite to the forward action, the applied potential being the same.

Direct current has been described for use in this invention on the electrodes 15 and 16, or their equivalents. This may be in the range of several hundred volts, or higher.

Alternating current, when desired, may be used and its effect is enhanced by the use of redox electrolytic liquids and the use of large counter-ions.

Figure 10:
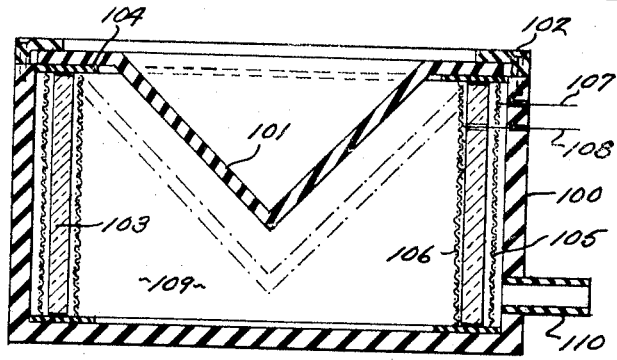

One such device for the use of alternating current in the present invention is illustrated in FIG. 10. This is a sonar device wherein a case or container 100 supports a pulse diaphragm 101 of shock wave type having generally the shape of a cone with its flanged edges supported and sealed as shown at 102. A cylindrical porous diaphragm 103 like that described at 13 in FIG. 1 is sealed to the container at top and bottom as indicated at 104. Electrodes 105 and 106 are provided on opposite sides of the diaphragm as described in connection with electrodes 15 and 16 in FIG. 1. These electrodes are insulated from the case or container and supplied with alternating current of suitable potential through the lines 107 and 108. When the potential is applied to the electrodes with the chamber 109 filled with an ionizing liquid as described in connection with FIGS. 1 and 2, pulses of pressure will be provided through the liquid to the pulse diaphragm 101 whereby to cause the latter to produce shock waves in the medium to which it is applied. The outlet 100 is connected to a suitable reservoir so that come and go of the liquid in the chamber 109 is provided.

FIG. 4 shows a plurality of devices similar to that construction indicated in FIGS. 1 and 2 connected in parallel. The container 111 is provided with an inlet passageway 112 and an outlet passageway 113. A plurality of porous diaphragms 114 are sealed at their opposite ends respectively to partition walls 115 and 116 adjacent the inlet and discharge passageways. Openings 117 lead from inlet passageway 112 to the underside of each of the diaphragms 114 as viewed in FIG. 4. Other openings 118 lead from the spaces between the parallel diaphragms 114 into the discharge passageway 113 from the spaces between the parallel diaphragms 114 and from the space above the top diaphragm and below the lowest diaphragm as indicated in FIG. 4. Positively and negatively charged electrodes 119 and 120 respectively are provided on the opposite sides of each of the diaphragms 114. These are similar to the electrodes described at 15 and 16 in FIG. 1. All of the electrodes 119 are connected to a suitable supply of positive electrical potential through line 121. All of the electrodes 120 are connected to a suitable supply of negative electrical potential through line 122. Thus, the action across each diaphragm 114 in FIG. 4 is similar to that described across diaphragm 113 in FIG. 1, namely, the flow is from the positively charged electrode through the diaphragm toward the negatively charged electrode and the flow through the device is indicated by the arrows. Thus, the flow in FIG. 4 is increased in quantity over what it would be through a single diaphragm of the same area but is at approximately the same pressure on the discharge side as would be true with any single diaphragm.

FIG. 5 shows the devices of this invention connected in series. The case or container 123 has a plurality of parallel diaphragms 124 sealed at their peripheries to the walls of the container. Positively and negatively charged electrodes respectively indicated at 125 and 126 on opposite sides of each diaphragm serve the function of the electrodes 15 and 16 of FIG. 1 and are of similar construction. The diaphragm 124 is like the diaphragm 13 of FIG. 1. All of the electrodes 125 are connected to he electrical conductor 127 for the supply of positive potential at suitable voltage similar to that previously described. All of the electrodes 126 are connected to the supply line 128 for the supply of negative electrical potential at suitable voltage. Preferably, but not necessarily, suitable baffles 129 and 130 are provided so that the incoming fluid through inlet passageway 131 is suitably diffused in its passage through the container 123 to the discharge outlet passage 132. It should be understood that the ionizing liquid used in the devices of FIG. 4 and FIG. 5 is similar to that described in connection with FIGS. 1 and 2 and that the passages 112 and 113 of FIG. 4 and those shown at 131 and 132 in FIG. 5 are connected in suitable closed systems so that the ionizing liquid is not dissipated.

A very large number of uses of this invention are possible and a few of them are set forth in FIGS. 6 through 13.

Figure 6:
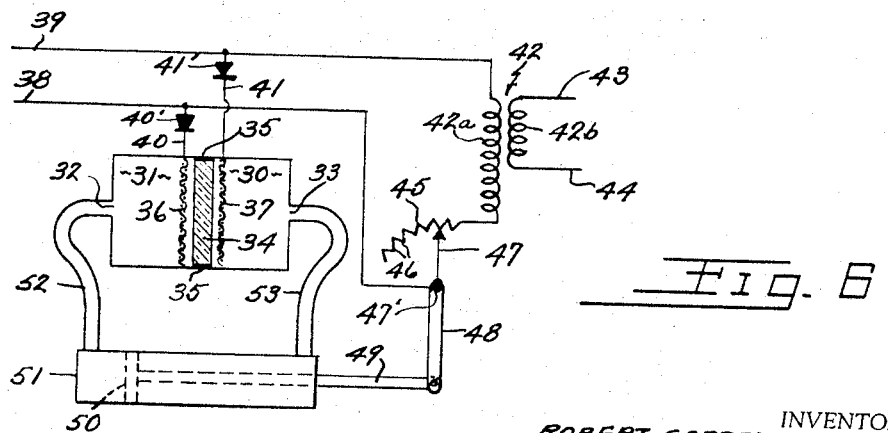
Figure 8:
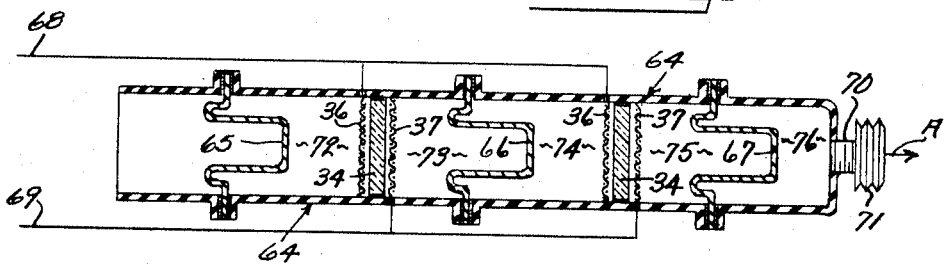
Figure 9:
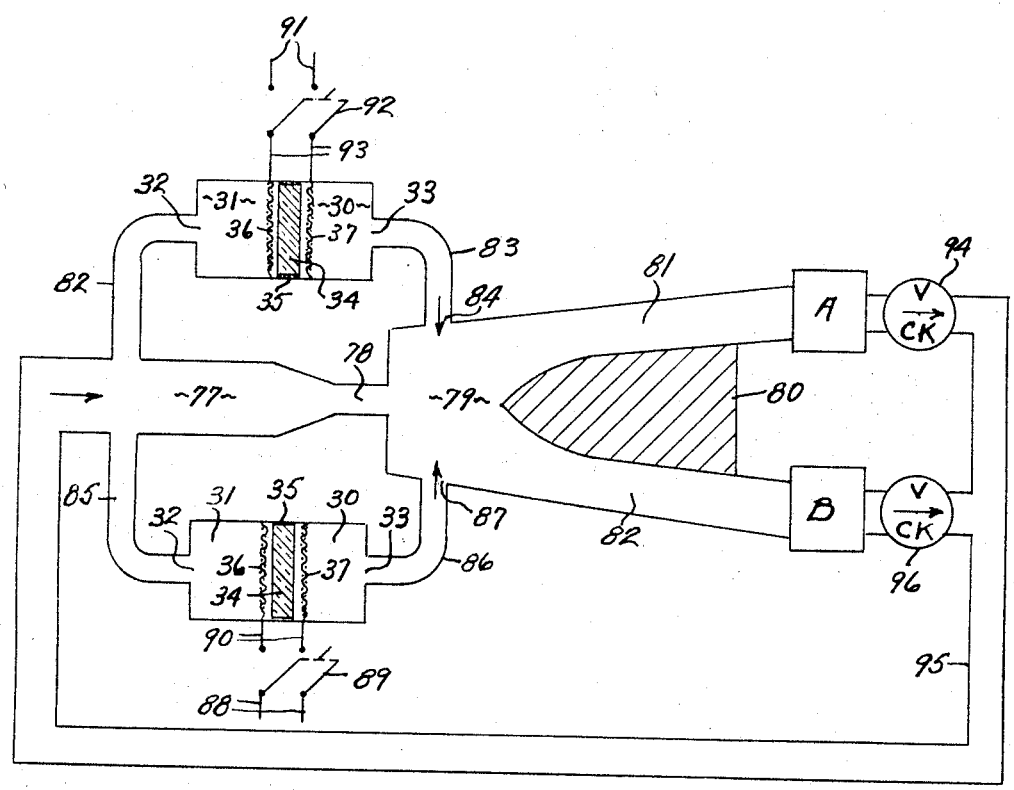

In FIG. 6 there is shown an electro-osmotic pump or pressure producer 30 which is like FIG. 1 in principle but slightly different in construction. It consists of a container 31 of any cross section having ports 32 and 33 at opposite ends of the container. In the mid-portion of the container between the ports there is a diaphragm or membrane 34 which is of the same character as described in connection with the diaphragm 13. This diaphragm is sealed against the wall of the container at 35 and the container is filled with an ionizing liquid as discussed in the first embodiment. This liquid cannot move between the ports 32 and 33 without passing through the membrane 34. Electrodes 36 and 37 are provided on opposite sides of the diaphragm and these electrodes have the same characteristic of those mentioned at 15 and 16 in connection with FIG. 1. This same sort of electro-osmotic device is also illustrated in FIGS. 7, 8 and 9 as will presently appear.

FIG. 6 represents a voltage regulating device. High voltage transmission lines are commercially used for conduction of electricity across the country. These high voltage lines are herein referred to as primary lines and they feed secondary lines for transmission of power to the ultimate user. These secondary lines have voltage reducing devices, such as transformers, in order to deliver lower voltage electricity in a usable range. Since the primary lines fluctuate and since the secondary lines must have a stable voltage, it is necessary to interpose a voltage regulating device in the system. This voltage regulating device may be a transformer with a movable secondary, or a movable core, or a tap changing transformer. Illustrated in FIG. 6 is the latter arrangement. The primary high voltage lines are indicated at 38 and 39. These are connected respectively by conductors 40 and 41 through rectifiers 40' and 41' to electrodes 36 and 37. A transformer 42 has a primary 42a connected in circuit with lines 38 and 39 and a secondary 42b which serves the secondary lines 43 and 44 to provide a stable lower voltage. In series with the winding 42a is a resistor 45 having a plurality of taps 46. The tap changing arm 47, pivoted at 47' is actuated by an insulating arm 48 which is pivotally connected to a piston rod 49 rigidly connected with a piston 50 which reciprocates in a hydraulic cylinder 51. The opposite ends of this cylinder are connects by conduits 52 and 53 respectively with the ports 32 and 33 of the electro-osmotic device.

In the operation of the device of FIG. 6, as the voltage fluctuates in the transmission lines 38 and 39 the potential impressed on the electrodes 36 and 37 will increase and decrease in like manner. The connections are so arranged that as the potential increases, the flow of the electrolytic fluid increases from right to left as viewed in FIG. 6 so that fluid pressure is increased on the left-hand face of the piston 50 and decreased on the right-hand face thereof so that the piston 50 and piston rod 49 move toward the right and the tap selector arm 47 moves in a counterclockwise direction about its pivot 47' so as to insert more resistance from 45 in the transformer winding 42a thus decreasing the potential delivered across the secondary lines 43 and 44. When the potential decreases in the primary lines 38 and 39, the opposite effect takes place and higher pressure is delivered through conduit 53 to the right-hand face of piston 50 and a lower pressure against the left-hand face thereof so that the piston 50 moves toward the left as viewed in FIG. 6 and the tap selector arm 47 moves in a clockwise direction thus cutting out resistance in the primary transformer circuit 42a. This will increase the potential applied across the secondary lines 43 and 44.

Figure 7:
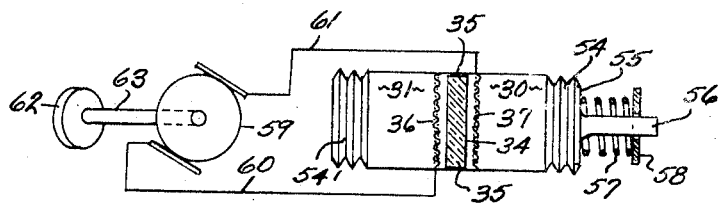

FIG. 7 shows the application of this invention to a device connected to a generator which produces a hydraulic force proportional to speed. In FIG. 7 the electro-osmotic device 30 is almost exactly like that shown in FIG. 6 and like parts have been given like reference characters including the container 31, the diaphragm 34 with its seals 35 and the electrodes 36 and 37. One difference here is that a flexible bellows 54 is provided at the right-hand end of the container 31 subject to the pressure of the electrolyte inside the container. This bellows terminates in a rigid sheet 55 which is rigidly connected to an output member 56 adapted to drive any desired member. A helical compression spring 57 surrounds the member 56 and is held between a fixed plate 58 and the rigid member 55 of the bellows attachment. Bellows 54' is provided to expand and contract opposite to similar action in bellows 54. A generator is shown diagrammatically at 59 having its output connected by conductors 60 and 61 respectively with the electrodes 36 and 37. The generator is indicated as being driven by a pulley or other driving device which drives shaft 63 which in turn drives the generator.

The operation of FIG. 7 will now be understood. The generator 59 may be either a D.C. or an A.C. generator whose output is rectified to D.C. The connections are such that as the generator speeds up, the potential across the electrodes 36 and 37 causes a movement of the ionizing liquid in device 30 to tend to move toward the right as viewed in FIG. 7 so as to extend the bellows 54 and to cause a movement of the output shaft 56 toward the right as viewed in FIG. 7. Upon a reduction of the speed of the driving member 62, the movement of liquid through the diaphragm 34 tends to reverse itself so as to reduce the pressure against the bellows 54 permitting the spring 57 to return the shaft 56 toward the left as viewed in FIG. 7. Thus, the electro-osmotic device produces a mechanical force which is proportional to a speed. It should be understood that the usefulness of this device might be as a governor on diesel engines and speedometers or the like.

FIG. 8 shows the use of a plurality of these novel electro-osmotic pressure devices in series to build up a pressure greater than produced by a single one of the devices. Here a container 64 made up of a plurality of sections is put together in such a fashion as to mount therein a plurality of flexible extendable rubber-like diaphragms 65, 66 and 67 mounted between suitable flanges on the container 64 with suitable sealing members between the edges of the diaphragm and these container flanges. To the left of rubber diaphragms 66 and 67, as seen in FIG. 8, there is a diaphragm 34 with associated electrodes 36 and 37 exactly as described in connection with FIG. 6. A source of potential is supplied in lines 68 and 69. Line 68 is connected to the electrodes 36 while line 69 is connected to all of the electrodes 37 in such a manner that this supply of potential to the electrodes is insulated from the container 64 just as is the case in FIGS. 6 and 7 with the supply of potential to the electrodes in containers 30. The container 64 is completely filled with ionizing fluid such as previously described in connection with FIGS. 1, 6 and 7. At the right-hand end of FIG. 8 is provided a port 70 which connects to any pressure driven member adapted to use the forces generated in the container 64 as about to be described. This is here shown as a flaxible bellows 71 adapted to produce a force in the direction of the arrow A.

In the use of the device of FIG. 8, the connections between the lines 68 and 69 is in such a direction that there is a tendency for the potential across the diaphragms 36 and 37 to urge the liquid through the diaphragms 34 toward the right as shown in FIG. 8. Thus, starting at the left of FIG. 8, the first diaphragm 34 will exert a pressure against the left-hand face of flexible diaphragm 66 so as to extend the same toward the right increasing the pressure in the chamber 73. Flexible diaphragm 65 permits this action to take place. The pressure in chamber 73 is transmitted to the liquid in chamber 74. The right-hand diaphragm 34 with its accompanying electrodes will then cause a tendency of the ionizing liquid to move from electrode 36 toward the electrode 37 thus inducing pressure in chamber 75 greater than that in chamber 74 and which is exerted against the flexible extendable diaphragm 67. This in turn will impose this increased pressure upon the liquid in chamber 76 and exert this pressure against a pressure actuated device 71, here shown as a closed bellows, tending to move it toward the right.

In FIG. 9, two of the electro-osmotic devices of this invention as shown in an application to use secondary liquid streams to switch hydraulic devices using boundary layer effects. Here each of the electro-osmotic devices 30 is identical with that described in connection with FIG. 6 and parts thereof have been given the same reference characters. A primary hydraulic stream is diagrammatically illustrated at 77. This discharges through an outlet 78 into a chamber 79, the discharge from which is split by a separator 80 so as to finally discharge down either one of the passages 81 or 82. Conduit 82 connects stream 77 with port 32 of the uppermost electro-osmotic device shown in FIG. 9 while conduit 83 connects the output from that cell to a discharge outlet 84. In like manner conduit 85 connects stream 77 to port 32 of the lower shown electro-osmotic device and discharge port 33 of this device is connected through conduit 86 with discharge port 87 leading into chamber 79. A source of potential 88 is connected through switch 89 and conductors 90 with electrodes 36 and 37 respectively of the lower shown device 30. In like manner, the potential source 91 is connected through switch 92 and conductors 93 with the electrodes 36 and 37 of the upper shown device.

The operation of the device of FIG. 9 will now be described. With switch 89 closed and switch 92 open, there will be no potential across the upper device 30 and the diaphragm 34 will block any flow through conduits 82 and 83 to the discharge outlet 84. Closed switch 89 will impress a potential between the electrodes 36 and 37 in a direction to cause a flow toward the right as viewed in FIG. 9 through conduits 85 and 86 out of the discharge port 87 which will tend to move a boundary layer in chamber 79 toward the discharge outlet 81. The well known Coanda effect will then switch the flow from stream 77 and port 78 through the discharge outlet 81. To reverse this flow toward the discharge outlet 82, switch 89 is opened so as to block flow through conduits 85 and 86 while switch 92 is closed. This causes a potential between electrodes 36 and 37 of the upper shown device so as to cause a flow through the cell and through conduits 82 and 83 to the discharge port 84. This will cause a flow downwardly through chamber 79 as viewed in FIG. 9 so as to move the boundary layer toward the discharge outlet 82 and thus switch the discharge of the stream in this direction. Outlet 81 discharges through system A and check valve 94 to conduit 95 and back to stream 77. Outlet 82 discharges through system B and check valve 96 to conduit 95.

Figure 11:
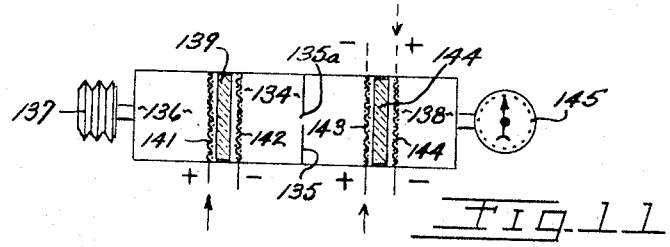

FIG. 11 shows a use of this invention to provide some of the functions of a computer. An electrically non-conducting casing 134 is divided into two compartments by a partition 135 through which is an opening 135a. The left-hand end of compartment 136 communicates with a bellows 137. The right-hand end of compartment 138 communicates with an indicating device 139, the character of which will be later discussed. Porous diaphragms 139 and 140 similar to those described in connection with diaphragm 13 and other diaphragms disclosed herein are sealed respectively against leakage to the walls of the chambers 136 and 138 respectively. Electrodes 141 and 142 are provided on opposite sides of diaphragm 139 while electrodes 143 and 144 are provided on opposite sides of the diaphragm 140. These electrodes 141, 142, 143 and 144 are similar to electrodes 15 and 16 previously described. In use of this device for addition, a voltage, say equivalent to five units, is applied to positive electrode 141 from a source not shown while voltage, equivalent to say three units, is applied to the positive electrode 143 as shown in full lines. According to the teaching of this invention, the pressure produced through the pores of diaphragms 139 and 140 will correspond respectively to the applied voltages. Thus, in chamber 136 a pressure will be provided on the right-hand side of diaphragm 139 equivalent to five units and this will pass through the opening 135a into chamber 138 where the voltage applied across diaphragm 140 will add pressure equivalent to three units and the total pressure will be fed to the indicator 145 which will thus give the addition equivalent to the total units. It is obvious that the indicator 145 may be calibrated in any units desired. To use the device of FIG. 11 for subtraction, the voltage equivalent to five units is again fed to the positive electrode 141 as previously described while the voltage equivalent to three units is no longer applied at the full line arrow of FIG. 11 but instead is applied in the position of the broken arrow of FIG. 11 to the electrode 144 while the electrode 143 is at this time made negative. Thus, pressure will be exerted through the pores of diaphragm 140 toward the left as viewed in FIG. 11 so that the pressure in compartment 138 opposes the pressure in compartment 136. Therefore, the difference between the pressure in compartment 136, equivalent to five units, is opposed by the pressure in compartment 138, equivalent to three units, so that the pressure transmitted to the indicator 145 is in this case equivalent to two units thus providing an operation in subtraction.

Figure 12:
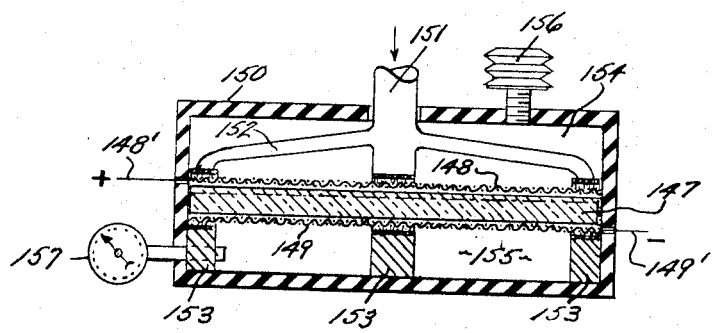

FIG. 12 shows a device for the use of this invention wherein the thickness and porosity of the diaphragm 147 may be varied for a useful purpose. Here the diaphragm 147 would have through pores as previously explained and would preferably be of such a character as to produce large counter-ions in the pores. This diaphragm is made of rubber or a compressible plastic and is provided with electrodes 148 and 149 on opposite sides thereof of the same character as the electrodes defined in connection with FIGS. 1 and 16. A suitable electrical potential is supplied to these electrodes through the leads 148' and 149'. The entire device is enclosed in a casing 150 to the walls of which the diaphragm 147 are sealed and from which the diaphragm may be electrically insulated but preferably casing 150 is electrically non-conducting and the leads 148' and 149' and also electrically insulated from the casing. Means is indicated at 151 for applying a load in the direction of the arrow. This means is connected by a spider 152, or in other suitable manner, with the upper electrode 148 which is reinforced to take this load and to apply it substantially evenly to the diaphragm 147. The electrode 149 is also reinforced and provided with supports 153 beneath it in order to resist the pressure applied from above. When such pressure is applied, there is a tendency for the ionizing liquid, filling the chamber of container 150, to flow from the upper chamber 154 toward the lower chamber 155 thus increasing the pressure in the lower chamber while at the same time compressing the diaphragm 147 as shown by the dot-dash line of FIG. 12. The bellows 156 communicating with chamber 154 permits this action. The squeezing of the diaphragm 147 changes its thickness and tends to decrease the pore size through the diaphragm, both of which changes result in a change in pressure in the chamber 155 so long as the potential between the electrodes 148 and 149 is held constant. A pressure device 157 such as a pressure gauge is shown communicating with the chamber 155 and this may be calibrated in order to read the load 151 directly, if desired, such change being brought about not by direct compression of the liquid in chamber 155 but rather by the change in the electro-osmotic device of this invention because of the change in thickness and pore size in the diaphragm 147.

Figure 13:
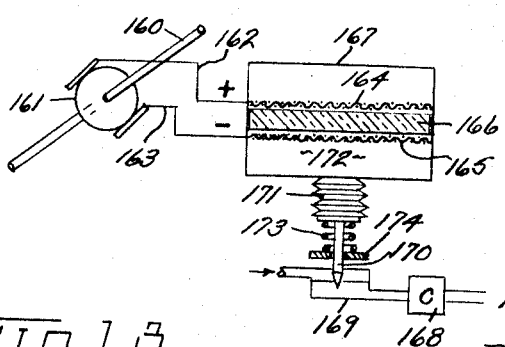
Figure 14:
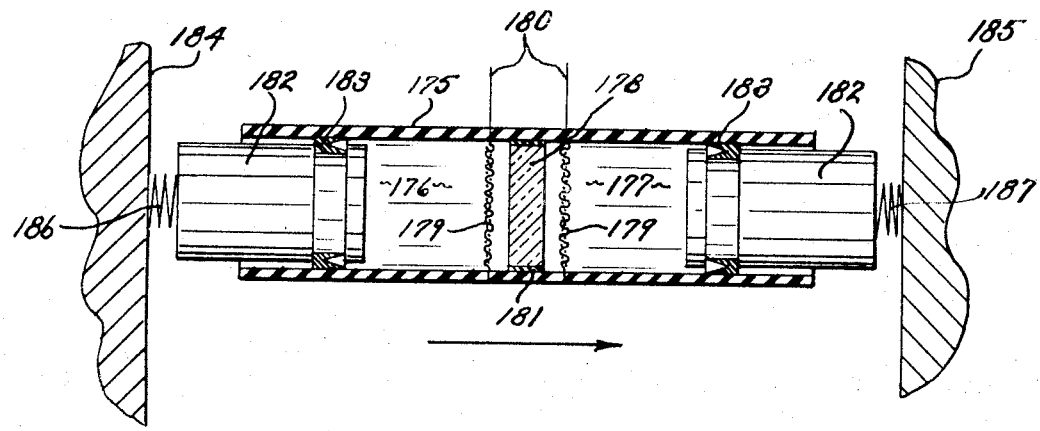

FIG. 13 shows still another device adapted for the use of the present invention. The showing is diagrammatic but indicates at 160 the rotatable speedometer cable of an automobile. The rotating cable is in driving relationship with a generator 161 having output leads 162 and 163 connected respectively with electrodes 164 and 165 on opposite sides of a porous diaphragm 166. The electrodes and diaphragm are like those described in connection with FIGS. 1 and 6. The diaphragm is sealed in and electrically insulated from a containing casing 167 which is filled with an ionizing liquid of the type previously described in this specification. At 168 is shown the carburetor of an automotive engine driving the automobile containing the speedometer cable 160 and the generator 161. The gasoline supply to this carburetor is through a needle valve casing 169 and connected conduits. The needle valve at 170 coacts with a suitable seat in the valve casing 169 to change the flow through the casing 169 to the carburetor 168 according to the position of the needle valve 170. The needle valve is rigidly attached to an expanding and contracting bellows 171 which is in communication with the chamber 172 in the lower part of the casing 167. A spring 173 compressed between a fixed abutment 174 and the lower end of the bellows 171 tends to move the needle 170 in an upward direction. The generator 161 will supply a varying potential to the electrodes 164 and 165 depending upon the speed of the automobile. This will cause a varying pressure in the chamber 172 according to the principles of the electro-osmotic device which is the subject matter of this invention. The greater the speed of the generator 161, the greater will be the potential across the electrodes 164, 165. This will generate in turn a greater pressure in the chamber 172 at higher speeds of the automobile. Thus the device may be set to hold whatever speed is desired in the automobile. The needle 170 when the speed becomes too high will be pushed toward a closed position in its associated seat in the casing 169 thus cutting off some of the flow of gasoline to the carburetor 168 which in turn will reduce the speed of the generator 161, thus reducing the potential across the electrodes 164 and 165, thus reducing the pressure in chamber 172 and permitting the spring 173 to again push the needle valve toward a more open position, and restore a little higher speed to the automobile.

Another use of this invention is illustrated in FIG. 14. Here a hollow cylindrical tube 175 is divided into chambers 176 and 177 by means of a porous diaphragm 178 which is like that described in connection with FIGS. 1 and 2, together with modifications of the diaphragm which have been heretofore suggested. Electrodes 179 are provided on opposite sides of the diaphragm and these are preferably of a gauze made from a noble metal and are inert to the ionizing liquid in chambers 176 and 177 when an electrical potential is present on the electrodes. Each electrode has a lead 180 coming out through a sealed opening in the container 175. Seals 181 are provided between the diaphragm and the inner surface of the container so as to prevent movement of liquid between the two chambers except through the pores of the diaphragm. The opposite ends of the tubular container 175 are closed by floating pistons 182 which are sealed against the inner surfaces of the container 175 by sealing rings 183 preferably of rubber or flexible plastic. A fixed abutment 184 at the left-hand of FIG. 14 and another 185 at the right-hand end limit the endwise movement of pistons 182. Preferably light springs 186 and 187 hold the pistons 182 always in contact with the liquid in chambers 176 and 177. The ionizing liquid in these two chambers is like that previously described and capable of giving stable operation for many hours with stable results.

One use of the device of FIG. 14 might be to indicate the acceleration or deceleration of a vehicle traveling in the direction of the arrow of FIG. 14. Upon deceleration of the vehicle, momentum will carry the pistons 182 toward the right in FIG. 14, such movement being limited by the fixed abutment 185. Such movement of the ionizing liquid through the pores of the diaphragm 178 will cause an electrical potential to occur across the leads 180.

Another use of this invention is to use the electro-osmotic device defined herein with an ionizing liquid which changes viscosity with changing temperature. Such a liquid is ethanol. When such a device is placed in communication with a chamber whose temperature is to be measured, a constant electrical potential is applied between the electrodes on opposite sides of the diaphragm and as the changing temperature varies the viscosity of the ionizing liquid, the pressure at the outlet side of the diaphragm will change. This pressure can be calibrated not in pounds but in temperature.

Another use of this improved electro-osmotic device is for the control of the voltages existing in three wire electrical systems. One or more of these electro-osmotic devices of this invention may be placed in one or more of the electrical lines whereupon a change in the potential in that particular line will change the pressure on the output side of the porous diaphragm of the electro-osmotic device and this pressure may be utilized to operate control devices to effect an equalization of the potential between a plurality of the electrical lines.

Many other uses of this invention will occur to those skilled in this art.

What is claimed is:

1. An electro-osmotic closed system comprising a container having two chambers, a purified nonaqueous liquid filling said chambers and having a hydrocarbon portion and a polar group and having a dielectric constant between 5 and 100, a porous diaphragm in said container submerged in said liquid and forming a partition between said chambers, said diaphragm having pores permitting flow between said chambers with pore openings not larger than 0.10 to 10.0 microns, said diaphragm sealed to said container, electrodes in said liquid on opposite sides of said diaphragm, said electrodes when subjected to electric potential being chemically inert to said liquid, an electrical conductor leading from each electrode to a point outside said container, and a redox material added to said nonaqueous liquid being such that when electrical potential of opposite polarity is applied to said electrodes the oxidation occurring at the anode substantially exactly balances the reduction occurring at the cathode so that the composition of said liquid remains in operational stable condition over a period of at least two hours of continuous application of a potential of 200 volts and higher.

2. The combination of claim 1, including means for applying an electrical potential of 200 volts and higher to said electrodes whereby an electro-kinetic effect tends to cause movement of said liquid through the pores of said diaphragm.

3. The combination of claim 1, including means for applying a pressure between said chambers, whereby to produce said electrical potential at said electrodes.

4. The combination of claim 3, wherein said container includes a movable wall enclosing a portion of at least one of said chambers, and means permitting increase in the volume of liquid in the other of said chambers, whereby said one wall may be caused to exert pressure upon the liquid in said one of said chambers causing flow of liquid through the pores of said diaphragm to the other of said chambers and causing a potential to be produced between said electrodes.

5. The combination of claim 1, including a chemical impregnated in said diaphragm which increases the zeta potential developed between said diaphragm and said liquid moving in the pores of said diaphragm.

6. A device as defined in claim 1 wherein said diaphragm is impregnated with a large quaternary ammonium ion.

7. A device as defined in claim 1 wherein said diaphragm is impregnated with a tetrapropylammonium hydroxide.

8. Apparatus as defined in claim 1, wherein said diaphragm is of fritted glass impregnated with a large quaternary ammonium ion.

9. Apparatus as defined in claim 2, wherein said ionizing liquid is confined in a closed system communicating between said chambers in a path additional to that through said diaphragm.

References Cited

UNITED STATES PATENTS

| | | | |
|---|---|---|---|
| 885,998 | 4/1908 | Hirtz | 204—296 |
| 1,352,763 | 9/1920 | Schwerin | 204—296 |
| 2,644,900 | 7/1953 | Hardway | 310—2 |
| 2,661,430 | 12/1953 | Hardway | 310—2 |
| 2,896,095 | 7/1959 | Reed et al. | 307—149 |
| 3,056,908 | 10/1962 | Estes et al. | 317—230 |
| 3,131,348 | 4/1964 | Taylor et al. | 324—94 |
| 3,143,691 | 7/1964 | Hurd | 317—231 |
| 3,209,255 | 9/1965 | Estes et al. | 324—94 |

OTHER REFERENCES

De Physique, 1867, pp. 444 and 445.

Journal of Electrochemical Society, December 1957, pp. 727–730.

The Journal of the Acoustical Society of America, vol. 36, No. 10, October 1964, pp. 1858–1860.

Solion (Distributed by O.T.S. Dept. of Commerce), Q.D. 561, U5–1958.

DONLEY J. STOCKING, *Primary Examiner.*

U.S. Cl. X.R.

204—296; 310—2; 317—231